United States Patent [19]
Mathews

[11] 3,732,910
[45] May 15, 1973

[54] ANTI-SKID TRACTION DEVICE

[76] Inventor: Arthur Cahlan Mathews, 15 Cordova Court, Portola Valley, Calif. 94625

[22] Filed: Sept. 2, 1971

[21] Appl. No.: 177,290

[52] U.S. Cl. ................................................152/225
[51] Int. Cl. .............................................B60c 27/12
[58] Field of Search ....................152/225 V, 228 V

[56] References Cited

UNITED STATES PATENTS

| | | | |
|---|---|---|---|
| 3,530,922 | 9/1970 | Mathews | 152/225 |
| 2,598,298 | 5/1952 | Pindjak | 152/225 |
| 2,767,761 | 10/1956 | O'Higgins | 152/225 |

Primary Examiner—James B. Marbert
Attorney—Boyken, Mohler, Foster & Schwab

[57] ABSTRACT

A device providing road-engaging elements adapted to extend transversely across and to be yieldably drawn and held against the road-engaging treads of pneumatic tires on a vehicle. The device is constructed to be readily applied to each tire from the outer side thereof relative to the side adjacent the vehicle body, without fastening it to the wheel. Said road-engaging elements are each generally of U-shape to straddle the tire with the closed end of the U extending across the tread and one of the legs at each opposite side, providing an inner leg at the inner side and an outer leg at the outer side, and the elements are at opposite sides of the tire in pairs spaced around the circumference. The device includes a member engageable with, but not securable to the outer side of the tire, and yieldable tensioning means at the outer side only of a wheel, yieldably hold said member substantially coaxial with the wheel and against said outer side of the tire, and yieldably hold the elements on the tire, which tensioning means, outer legs, and said member are arranged and formed to coact to hold the road-engaging elements substantially uniformly tight against the road-engaging surface of the tire tread from side-to-side of the tread irrespective of the degree of radially inwardly directed tension applied to said outer legs by said tensioning means. Thus the inner legs on said elements may be quite short.

10 Claims, 5 Drawing Figures

PATENTED MAY 15 1973
3,732,910
FIG. 2
FIG. 1
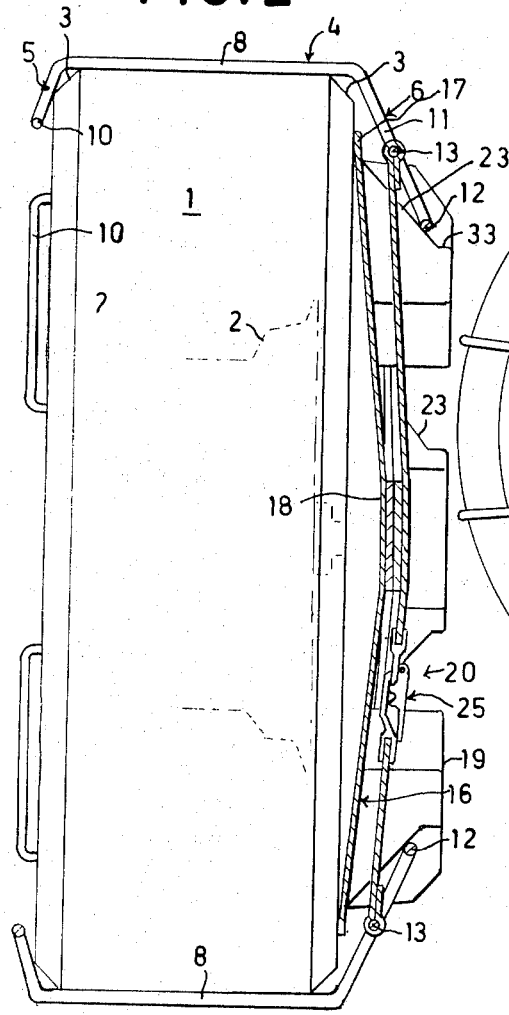
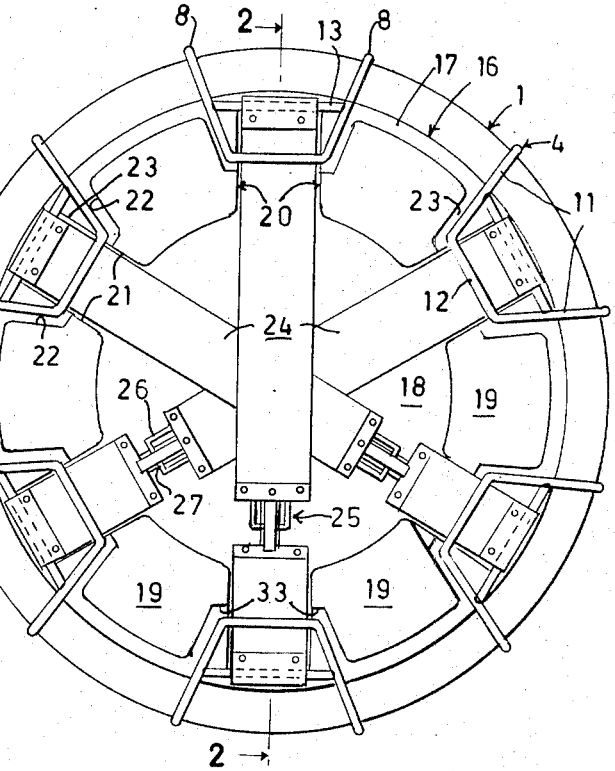
FIG. 3
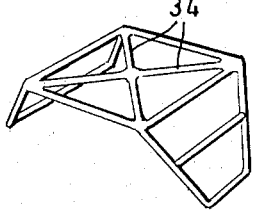
FIG. 4
FIG. 5
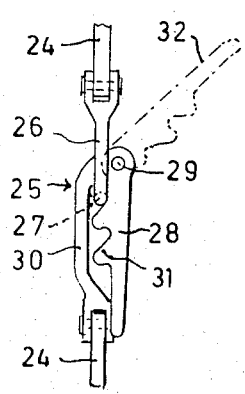
INVENTOR.
ARTHUR C. MATHEWS
BY
Boykin, Mohler, Fosters Schwab
ATTORNEYS

ANTI-SKID TRACTION DEVICE

BACKGROUND OF THE INVENTION

This invention is similar to and an improvement on the invention disclosed in my U.S. Pat. No. 3,530,922 of Sept. 29, 1970.

Heretofore in anti-skid devices, in which the legs at one side of generally U-shaped elements straddling a tire, have been drawn radially inwardly to draw the closed ends of the U of each element against the tread, the road-engaging elements are more tightly drawn against the edge of the tread at the side of the tire where the tension is applied, than at the opposite edge. In other words the road-engaging elements would tilt toward the side where the tensioning force was applied.

This could be overcome to a degree by a heavy, cumbersome use of rigid arms, rigid with the U-shaped elements slidably supported in guides secured on the wheel, but where the U-shaped elements were tensioned against the tread by tensioning means at one side only of the tire, which was desirable from the standpoint of lightness of weight and ease of installation and removal, the objection remained.

SUMMARY

One of the objects of this invention is the provision of a simple, economical, effective, light weight, anti-skid device for a wheel having a pneumatic tire thereon, that includes U-shaped road-engaging elements that extend across the tread of the tire with the legs of each element straddling the tire, and which elements are applied to each tire from its outer side only and are tightened against the tread from the outer side and are unsecured to the wheel, and which device includes a member and yieldable tensioning means at the outer side of the wheel in engagement with the legs on said elements at said outer side in cooperative relation for holding said elements in substantially uniformly tight engagement with the tread surface from side to side irrespective of the radially inwardly tension applied to said outer legs by said tensioning means.

Other objects and advantages will appear in the description and drawings.

DESCRIPTION OF DRAWINGS

FIG. 1 is a side elevational view of the anti-skid device on the tire of a vehicle.

FIG. 2 is an enlarged cross-sectional view at line 2–2 of FIG. 1, certain parts beyond the section line being omitted for clarity and part of the rim and end of the axle being indicated in broken lines.

FIG. 3 is a reduced size perspective view of one of the road engaging elements of the device.

FIG. 4 is an enlarged elevational view in full line of one of the tensioning members in locked position with the tensioning member shown in broken lines in released position.

FIG. 5 is a modification of the structure shown in FIG. 3.

DESCRIPTION OF THE DISCLOSURE

In FIGS. 1 and 2 the outline of the tire on a wheel is generally designated 1, and in FIG. 2 a portion of the conventional drop-center rim is indicated in broken lines at 2 (FIG. 1), the outer side of the tire being the right-hand side as seen in FIG. 2 and the side facing the viewer as seen in FIG. 1. The shoulders of the tire are indicated at 3. Tires may vary in cross-sectional outline and size, and obvious variations may be made in the present invention to adapt it to the varying contours and sizes, although the present invention is not restricted to one size or contour.

The road-engaging elements shown in the drawings comprise generally U-shaped elements generally designated 4 having a shorter leg 5 adapted to extend over the inner shoulder 3 of a tire, and an outer leg 6 adapted to extend over the outer shoulder.

The "inner" side of the wheel, which includes the tire, is the side that faces the vehicle or chassis of the vehicle, while the "outer" side is the side that faces outwardly of the vehicle.

These words "inner" and "outer" wherever used herein with reference to the tire or wheel or lateral surfaces of the tire or wheel will means the sides or surfaces as above defined.

The closed end of each road-engaging element is the portion that extends transversely across the tread of the tire and that is connected with the legs.

Each generally U-shaped road-engaging element may be in the form of a skeleton frame (FIG. 3) in which a pair of parallel, spaced, road-engaging bars 8 extend transversely across the tread of the tire, and extensions 9 of bars 8 form the shorter leg, which extensions are connected by a cross bar 10 forming the outer end of leg 5. The extensions 9 may extend across and past the inner shoulder only a relatively short distance (FIG. 2) and at an obtuse angle relative to bars 8.

The longer leg 6 is defined by longer extensions 11 of bars 8, and also extend at an obtuse angle relative to said bars (FIG. 2). Said extensions 11 extend convergently from the ends of bars 8 (FIGS. 1, 3) and are connected at their outer ends by cross bar 12 forming the outer end of leg 6. An intermediate bar 13 connects extensions 11 between the upper and outer ends of leg 6 and its main function is to provide for connection with a tensioning member as will later be explained.

A circular disc, generally designated 16, formed with a marginal portion 17 (FIGS. 1, 2) is adapted to be positioned coaxial with the wheel having tire 1 thereon, and is dished outwardly relative to the wheel so that said marginal portion engages the outer side wall of the tire along a line spaced radially inwardly of shoulder 3. Thus the central portion 18 of the disc projects axially outwardly relative to the marginal portion 17 and outwardly of the wheel axle and hub cap.

Around the central portion are adjacent pairs of spaced outwardly projecting portions 19 in an annular row equally spaced from each other providing a radially extending, outwardly opening groove 20 between each adjacent pair of projecting portion 19. The outer ends of these grooves are open and may terminate at the marginal portion while the inner open ends terminate at the central portion 18. The opposed side walls 21 of grooves 20 are parallel except for portions 22 that extend divergently outwardly from points adjacent to, but spaced from the inner open ends and from the axially outwardly facing surfaces of projections 18. The lower edges of these portions 22 extend slantingly to the marginal portion 17 and an inclined ledge or shoulder or ramp 23 joins the lower edge of each portion 22 with the side 21 of the groove that is at the same side.

Pairs of grooves or recesses 20 are diametrically opposite each other along opposite marginal portions of the disc, and elastic bands 24 are adapted to fit within the grooves.

As previously stated, the intermediate cross bars 13 are for securement to tensioning means, or bands 24.

When a pair of road-engaging elements 4 are fitted over a tire at two diametrically opposite points, with opposite ends of the band secured to the cross piece 13 of said pair and the band is tensioned, the outer ends of the longer legs 6 of the element 4 at the ends of the end bar 12 will slidably ride on shoulders 23, while the shorter leg 5 will be against shoulders 3 of the tire. The tighter the tension on the road-engaging elements the more firm the rod engaging bars will engage the tread and the more firmly the shorter leg 5 will engage the tire at the shoulder adjacent to said leg. The element fulcrums or tends to fulcrum about the outer end of the longer leg 16 to effect the aforesaid result.

Each band 24 may be in two parts or sections releasably connected by a tensioning device 25. Each device or coupling may comprise an eye 26 secured to the end of one section of each band 24. The outer closed end of each eye is a bar 27. An arm 28 is connected by a pivot 29 to the laterally offset end portion of an elongated member 30. Member 30 is secured to the terminal end of the other section of the band. One side of arm 28 is formed with one or more notches 31.

To apply each opposite pair of elements 4 on a tire at opposite points around the tire, the pairs of opposite elements are applied in succession. The elements 4 of each pair, at a time, are positioned over the tire at opposite points with their longer legs 6 at the outer sides of the tire. This is relatively easy inasmuch as the legs 5 are short, and are readily passed over the tread, even though the fender may be relatively close.

After the first pair of road and tire-engaging elements 4 are positioned over the tire, the arm 28 on one of the belt sections is slipped through the eye 26 on the other section and bars 27 on the eye may be inserted in one of the notches 31 in arm 28 when the arm is in the released position 32, (FIG. 4).

The disc 16 may be then positioned between the loosely coupled band 24 and the tire in a position in which a pair of aligned grooves 20 are in register below the connected band. Arm 28 may then be swung to the full line position, thus tensioning the band. The disc 16 will then be held in position with its marginal portion 17 against the side of the tire, and the shorter leg 5 on the road-engaging elements 4 tight against the inner shoulder 3 of the tire and the tread-engaging bars 8 against the tread. The provision of several notches 31 enables different degrees of tensioning, if desired, or adapts the device to differently inflated tires and different sized tires.

The remaining bands 24 are applied in the same manner as above-described, and when all are in position, axial tension will be applied to the disc to tightly hold it coaxial with the tire and against its outer side.

In each instance, the pivot 29 will move past the line of maximum tension when the arm 28 is swung to the full line position, to hold the bands in tension until the arms are pulled outwardly.

The distance between the legs 5 and 6 may obviously be sufficient to enable the device to be applied to tires of different widths. The inclined seat or ledge 23 on which the outer end of the longer legs 6 ride during tensioning of the elements 4, insures a tight fit of the elements even though the distance between the legs 5, 6 are greater than the width of the tire.

A stop 33 is provided at the upper end of each inclined seat or ledge 23. This stop provides a fixed fulcrum point for each of the road engaging elements 4 under circumstances where the contour or size of the tire, or its degree of inflation would result in undesired looseness of the elements on the tire.

The degree of elasticity of the yieldable bands 24 is such that the elements 4 will still pivot upon engagement of the outer ends of the legs 6 and stops 33 so as to insure firm yieldable engagement between the bars 8 and the tread of the tire, and to prevent the elements 4 from being pulled off the tire. In some instances the outer ends of the legs 6 will initially be in engagement with the stops 33 when the elements are installed on the wheel.

The spacing between the road-engaging bars 8 is preferably equal around the tire where this portion of the tread-engaging elements is restricted to the use of bars 8 only.

It should be noted that the distance between the outwardly diverging opposed sides 22 of the grooves 20 is such as to prevent any wedging or bending of the legs 6 in the grooves. In actual use, as the leading tread-engaging bar 8 engages the road during rotation of the wheel, the trailing bar 8 tends to lift away from the tread, and the spacing between sides 22 permits a slight movement of this kind.

In the modification shown in FIG. 5 the tread and road engaging portion has an open tread design made up of bars 34 that are integrally formed with the legs of the U-shaped elements, that may be more effective for preventing lateral skidding as well as having the traction feature.

The entire device may be formed of a tough, relatively rigid, plastic so as to enable a certain amount of resiliency and to resist corrosion and rust.

Common to the different forms of the invention is the structure in which the tensioning force of the yieldable means 24 is applied to the longer legs at points intermediate the terminal outer ends of the legs and the tread-engaging means or bars 8 with the portion between said terminal outer ends and bars being spaced from the tire-engaging means or discs 18.

This structure, plus the fact that the terminal outer ends of the legs are in pivotal and slidable engagement with the inclined surfaces or ledges 22, keeps the bars in engagement with the tread, without tilting, even when the tire flexes under a load.

I claim:

1. In an anti-skid traction device for use on a pneumatic tire on the wheel of a land vehicle, which device includes a plurality of generally U-shaped elements having inner and outer legs respectively at the inner and outer sides of the tire and tread engaging pieces connecting one of the ends of said legs and extending across the tread of said tire, when said elements are in operative position, the improvement comprising:

a. tire-engaging means adapted to be positioned against the outer side of said tire spaced radially inwardly from the tread of the latter and between said outer legs and said tire when said elements are in said operative positions, b. the outer legs of said elements being of a uniform length and having terminal outer ends in pivotal engagement with said tire-engaging means for movement of said tread-engaging pieces and said inner legs generally radially inwardly about the points of engagement between said terminal outer ends and said tire-engaging means, and c. elongated, yieldable means connected with the outer leg of each of said elements at a point spaced between the tread-engaging piece and said terminal outer end of said outer leg extending radially inwardly relative to such tire for effecting said movement of said tread-engaging pieces about said points of engage-ment between said terminal ends of said outer legs and said tire-engaging means upon tensioning said yieldably means when said elements are in said operative positions, and each of said yieldable means including means for so tensioning the same.

2. In the anti-skid traction device as defined in claim 1;

d. said tire-engaging means including stop elements thereon engageable with the terminal outer ends of said legs for defining fixed pointed about which said elements are adapted to pivot upon tensioning said yieldable means.

3. In the anti-skid traction device as defined in claim 1;

d. said tire-engaging means comprising a disc coaxial with said tire when against said outer side of the latter having outwardly facing element-engaging surfaces pivotally and slidably supporting said terminal outer ends of said outer legs during said tensioning of said tensioning means.

4. In the anti-skid traction device as defined in claim 3;

e. said element-engaging surfaces extending generally radially and angularly outwardly toward the axis of said tire when said disc is in engagement with the outer side of said tire under the influence of the tensioning of said yieldable means whereby the tread-engaging pieces and inner legs of said elements will be held tightly against said tire during flexing of such tire upon its rotation under a load.

5. In the anti-skid traction device as defined in claim 4;

f. said U-shaped elements being in pairs at diametrically opposite points around the tire when in said operative positions, and said yieldable means comprising elastic members respectively connected at the opposite ends thereof with the elements of each opposite pair thereof.

6. In the anti-skid traction device as defined in claim 3;

e. said elements and said tire-engaging means being automatically releasable from said tire and wheel upon releasing the tension on said yieldable means, and f. said disc being formed around its outer marginal portion with an annular row of equally spaced recesses for receiving and positioning said tread-engaging elements around such tire when said disc is against said tire and said elements are in said operative position, g. each of said recesses including a bottom wall having a pair of said element-engaging surfaces thereon, and a channel between said surfaces for said elongated yieldable elements.

7. In combination with the wheel of a motor vehicle, which wheel includes a pneumatic tire having inner and outer lateral sides respectively facing inwardly and outwardly of the sides of said vehicle and a road-engaging tread, an anti-skid traction device comprising;

a. a plurality of generally U-shaped elements equally positioned around said tire having inner and outer legs respectively extending generally radially inwardly over the inner and outer sides of said tire at the tread thereof, and tread-engaging pieces connecting the outer ends of said legs and extending horizontally across and in engagement with the tread-engaging tread of said tire, b. tire-engaging means positioned against, but free from attachment to outer lateral side of said tire, c. said outer legs extending laterally terminating in terminal ends positioned over and in pivotal and slidable engagement with said tire-engaging means at points spaced radially inwardly and axially outwardly of said tread and wheel, d. the portions of said outer legs between said terminal outer ends thereof and said tread-engaging pieces being free from engagement with said tire and said tire-engaging means whereby a radially inwardly directed force applied to each of said legs at a point spaced between its terminal outer end and the tread-engaging piece will cause said U-shaped element to fulcrum about the point of engagement between said terminal outer end and said tire-engaging means for moving and holding said tread-engaging piece horizontally against said tread during rotation of the tire on the ground and during flexing of said tire under a load, and e. yieldable means connected with each of said legs at said point spaced between its terminal outer end and said tread-engaging piece for so applying said radially inwardly directed force.

8. In the combination as defined in claim 7;

f. said yieldable means and said tread-engaging elements being free from attachment to said wheel and to said tire-engaging means, g. manually actuatable means independently of said wheel and tire-engaging means connected with said yieldable means for releasably tensioning the latter when said U-shaped elements and tire-engaging means are in operative position on a wheel.

9. In the combination as defined in claim 7;

f. said tire-engaging means comprising a circular disc having a plurality of recesses therein removably receiving said outer legs for positioning said U-shaped elements in predetermined positions around said tread with said terminal outer ends of said outer legs in said engagement with said tire-engaging means on portions of the bottoms of said recesses.

10. In the combination as defined in claim 9;

g. said portions of said recesses being ledges along opposite sides of said recesses, and said yieldable means being respectively disposed in the portion of each recess between said ledges, said last-mentioned portion being deeper than the position of said ledges.

* * * * *